United States Patent [19]

Duncan

[11] Patent Number: 4,501,362

[45] Date of Patent: Feb. 26, 1985

[54] APPARATUS AND METHOD FOR COMPRESSING A SLEEPING BAG INTO A CONTAINER AND THE CONTAINER THEREFOR

[75] Inventor: James W. Duncan, Arden, N.C.

[73] Assignee: Stencel Aero Engineering Corporation, Arden, N.C.

[21] Appl. No.: 373,149

[22] Filed: Apr. 29, 1982

[51] Int. Cl.³ ............................................. B65D 85/16
[52] U.S. Cl. .................................. 206/525; 206/83.5; 206/527; 190/2; 5/413
[58] Field of Search ...................... 206/527, 525, 83.5, 206/522; 5/413; 190/2

[56] References Cited

U.S. PATENT DOCUMENTS

| | | | |
|---|---|---|---|
| 1,805,415 | 5/1931 | Pendarvis et al. | 190/2 |
| 2,573,375 | 10/1951 | Winstead | 206/522 |
| 3,712,568 | 1/1973 | Grasso et al. | 206/525 |
| 3,828,856 | 8/1974 | Wallis | 206/527 |
| 4,294,352 | 10/1981 | Fitzke | 206/223 |

OTHER PUBLICATIONS

OT & E Test Results, by Exhibit A, B C & D; Dept. of Air Force and Stencel A.E.C.

Primary Examiner—William T. Dixson, Jr.
Attorney, Agent, or Firm—Roylance, Abrams, Berdo & Goodman

[57] ABSTRACT

A hinged container with a releasable closure for receiving a compressed down sleeping bag therein. The container comprises a pair of mating top and bottom members coupled at one end by a hinge; and the closure comprises a pair of bars which are rigidly coupled, respectively, to the top and bottom members and a pair of torsional shear bolts releasably coupling the bars together. These bolts are sheared by pivotal movement of two levers coupled thereto. The apparatus for compressing the sleeping bag into the container comprises an elongated, open-ended sleeve; a hydraulically-actuated compressing ram movable into and out of the sleeve; and an assembly at an end of the sleeve for releasably securing the container to the sleeve with an open end of the container aligned with the open end of the sleeve. The container closure is carried by the front of the compressing ram and is rigidly coupled to the container after the sleeping bag is compressed into the container by the ram and while the container is secured at the end of the sleeve.

10 Claims, 20 Drawing Figures

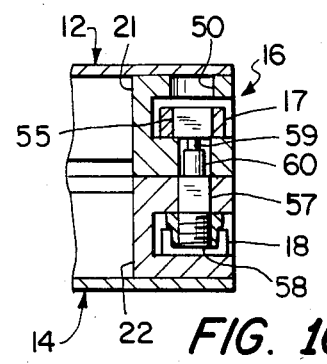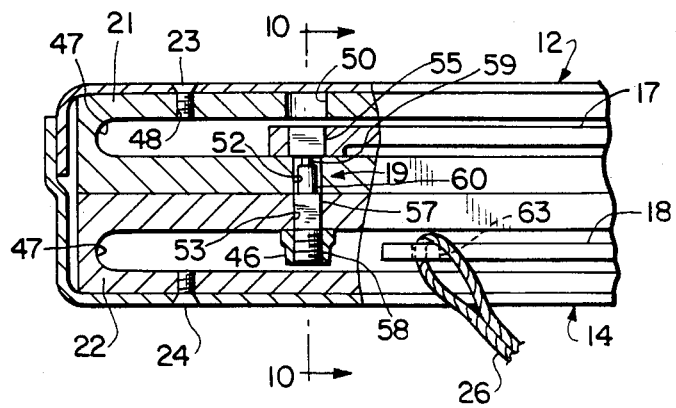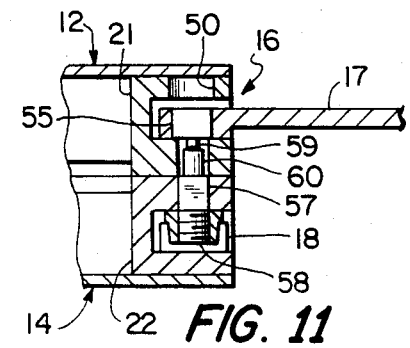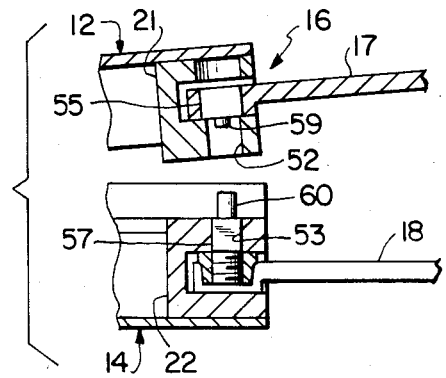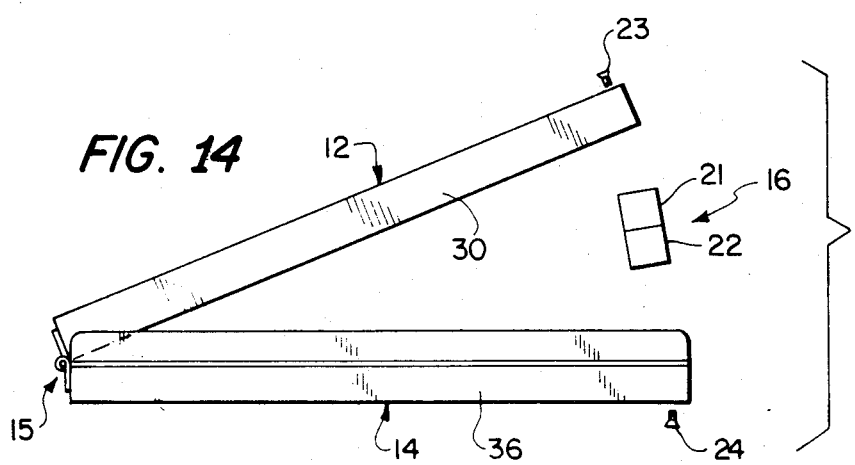

4,501,362

APPARATUS AND METHOD FOR COMPRESSING A SLEEPING BAG INTO A CONTAINER AND THE CONTAINER THEREFOR

FIELD OF THE INVENTION

The invention relates to a hinged container with a releasable closure for receiving a compressed down sleeping bag therein, as well as an apparatus and method for compressing the sleeping bag into the container using an elongated open-ended sleeve and a hydraulically-actuated compressing ram. The sleeping bag-packed container is especially useful in aircraft ejection seat survival kits.

BACKGROUND OF THE INVENTION

Survival kits, especially for use in aircraft ejection seats, commonly include a sleeping bag and preferably one made with goose down. To be effective, the sleeping bag should be tightly packed in a container which is small and light weight and which provides a secure closure, reliable long term storage and reliable opening. The bag should also be easily removable from the container since the crew may have suffered injuries before, during or after the ejection. In addition, the sleeping bag itself should be capable of being compressed into a small container and yet effective after removal therefrom. The packing techniques for such a sleeping bag should also insure that the installed sleeping bag is not damaged. While there have been various attempts at providing all of these advantages, there is still room for improvement in providing a container for a compressed sleeping bag and an apparatus and method for so compressing the bag into the container.

SUMMARY

Accordingly, a primary object of the invention is to provide a container for a compressed sleeping bag that is small and light weight and that provides a secure closure, reliable storage and reliable and easy removal of the bag from the container.

Another object of the invention is to provide an apparatus and method for compressing the sleeping bag into such a container with little damage to the bag and a compression of the sleeping bag into a small volume.

Another object of the invention is to provide such a container that allows for easy removal of the bag in survival conditions without damage to the bag and without extreme effort.

The foregoing objects are basically attained by providing a container for such a compressed down sleeping bag, the combination comprising a first planar rectangular member having depending flanges on two sides and an end; a second planar rectangular member having depending flanges on two sides and an end; a hinge assembly, coupled to the end flanges of the first and second members, for hingedly coupling the first and second members; and a closure assembly, coupled to the first and second members, for releasably coupling the first and second members in a closed position against the force of the compressed sleeping bag contained therein, this closure assembly including a first bar rigidly coupled to the first member at the other end thereof, a second bar rigidly coupled to the second member at the other end thereof, a frangible member coupled to the first and second bars for preventing separation thereof, and a lever rigidly coupled to the frangible member for breaking the frangible member upon pivotal movement thereof relative to the first and second members to allow separation thereof.

Advantageously, two frangible members are used in association with two releasing levers, these levers being exposed at an end of the container for easy access. The frangible member is advantageously a torsional shear bolt.

The foregoing objects are also attained by providing an apparatus for compressing a down sleeping bag into a container having a open end and a closure therefor, the combination comprising a rigid sleeve for initially receiving the sleeping bag therein and having first and second open ends; a compressing ram located adjacent the sleeve; an assembly for moving the compressing ram into and out of the sleeve to draw the sleeping bag into the sleeve and then push the sleeping bag into the container; an assembly coupled to the sleeve first open end for releasably supporting the container thereon with the open end of the container aligned with the sleeve first open end; a mechanism on the ram for releasably coupling the closure for the container thereto; and a series of passages formed in the sleeve for applying fasteners to the closure and container when the sleeping bag and closure have been moved into the container by the compressing ram.

The foregoing objects are also attained by providing a method of compressing the down sleeping bag into the container having an open end and a closure therefor, comprising the steps of maneuvering the sleeping bag into an open ended sleeve, rigidly supporting the container at a first open end of the sleeve with the open end of the container aligned with the first open end of the sleeve, interposing the closure between a compressing ram and an end of the sleeping bag adjacent the second open end of the sleeve, moving the compressing ram towards the first open end to push the sleeping bag and closure through the sleeve and into the container, rigidly coupling the closure to the container with the compressed sleeping bag contained therein, and removing the container from its location at the first open end of the sleeve.

Advantageously, the step of rigidly coupling the closure to the container comprises the steps of passing a series of fasteners through the sleeve and applying these fasteners to the container and closure, all performed before the step of removing the container from its location at the first open end of the sleeve.

Other objects, advantages and salient features of the invention will become apparent from the following detailed description, which, taken in conjunction with the annexed drawings, discloses a preferred embodiment of the invention.

DRAWINGS

Referring now to the drawings which form a part of this original disclosure:

FIG. 9 is a fragmentary front end elevational view in partial section showing the torsional shear bolt coupled to the first and second bars in the closure assembly;

FIG. 10 is a side elevational view in section taken along line 10—10 in FIG. 9;

FIG. 11 is a side elevational view in section similar to that shown in FIG. 10 except that the upper releasing lever has been pivoted to break the shear bolt coupled thereto;

FIG. 12 is a side elevational view in section similar to that shown in FIG. 11 except that both of the releasing levers have been pivoted to break their associated shear bolts and the top and bottom members forming the container have been pivoted about the hinge assembly to a partially opened position;

FIG. 14 is a side elevational view of the container showing the location and connection of the closure assembly to the top and bottom hingable members thereof;

Figure 18:
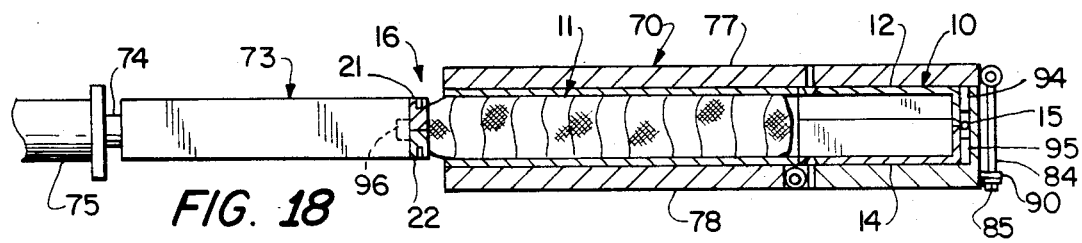
FIG. 18 is a view similar to that shown in FIG. 17 except that the closure assembly has been interposed between the compressing ram and the sleeping bag and the container has been received adjacent the sleeve with the open end in alignment therewith.
Figure 19:
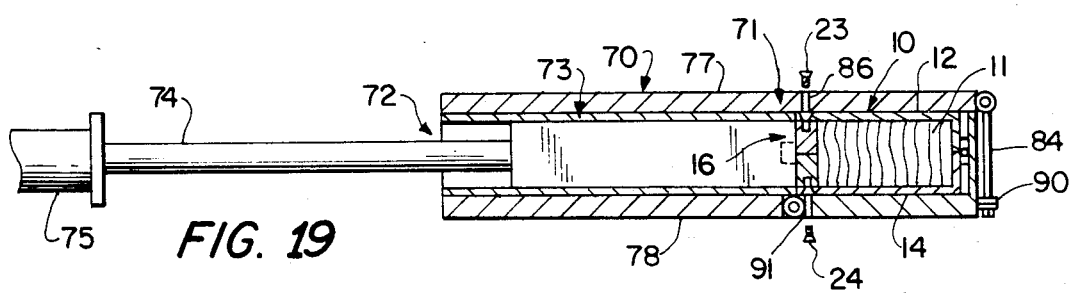
Figure 20:
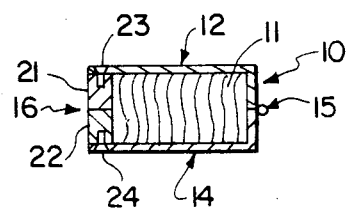

FIG. 19 is a view similar to that shown in FIG. 18 except that the compressing ram has been extended into the sleeve to push the sleeping bag and closure assembly into the container, with fastening screws about to be passed through the sleeve to secure the closure assembly and container together; and FIG. 20 is a view of the container having the sleeping bag compressed therein and the closure assembly rigidly fastened to the container.

DETAILED DESCRIPTION OF THE INVENTION

Figure 3:
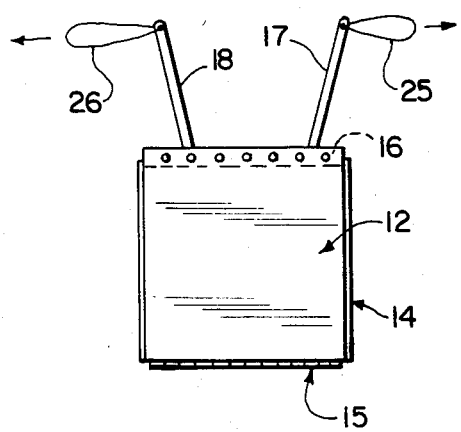
FIG. 3 is a top plan view similar to that shown in FIG. 2 except that both of the releasing levers having been fully pivoted, thereby breaking the torsional shear bolts keeping the container closed.
Figure 4:
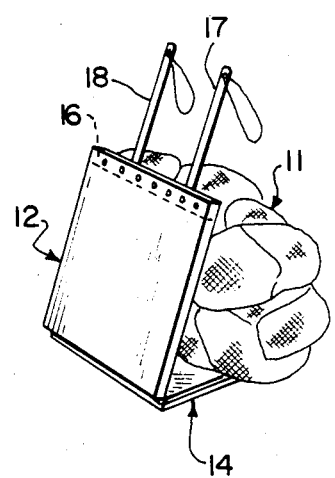
FIG. 4 is a perspective view of the container in accordance with the invention showing the sleeping bag expanding outwardly and thereby opening the hinged container after the torsional shear bolts have been broken.
Figure 5:
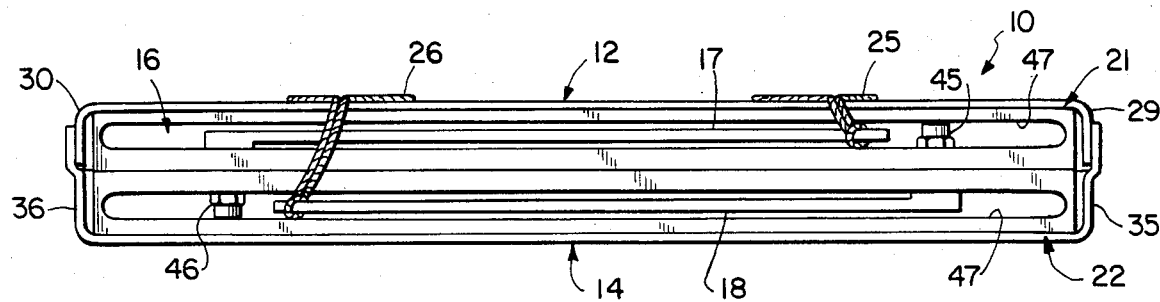
FIG. 5 is a front end view in elevation of the closure assembly for the container showing the two releasing levers.
Figure 6:
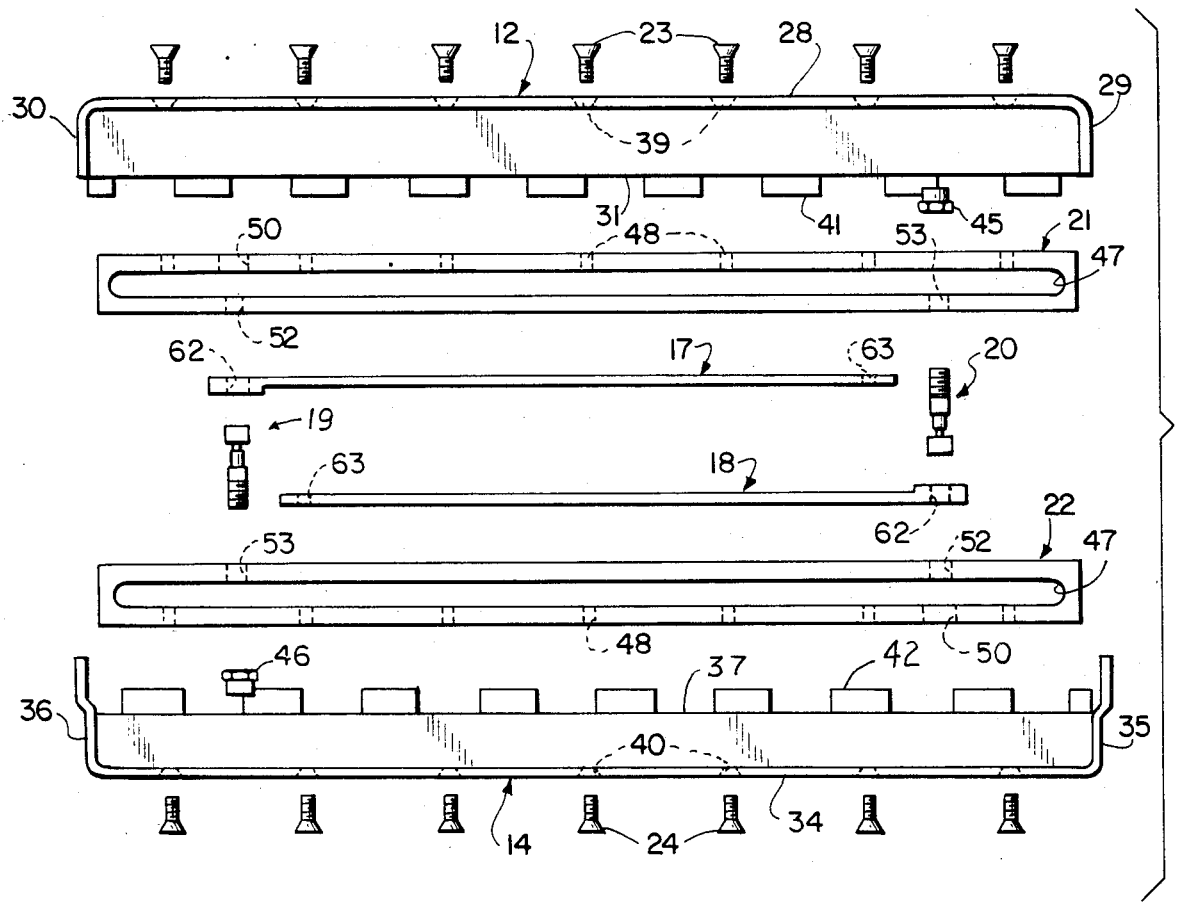
FIG. 6 is a front end exploded elevational view of the container.

As seen in FIGS. 1-8, the container 10 in accordance with the invention encloses a compressed down sleeping bag 11 therein. The container 10 includes a top member 12, a bottom member 14, a hinge assembly 15 hingedly coupling the top and bottom members, and a closure assembly 16 at the end of the container opposite the hinge assembly. The closure assembly includes an upper releasing lever 17 and a lower releasing lever 18, with upper releasing lever 17 being coupled to a torsional shear bolt 19 and lower releasing lever 18 being coupled to a torsional shear bolt 20, as seen in FIG. 6. The closure assembly also includes first and second bars 21 and 22, as seen in FIGS. 5 and 6, which receive the bolts and levers therein and which are rigidly coupled together by the bolts and to the top and bottom members by screw fasteners. Fasteners 23 couple the first bar 21 to the top member 12 and fasteners 24 couple the second bar 22 to the bottom member 14. To assist in pivoting the releasing levers from their stowed positions shown in FIGS. 1 and 5, a pair of nylon lanyards 25 and 26 are coupled to the levers.

The sleeping bag 11 is preferably insulated with goose down and, while it is compressed into a small volume, it has been found that after a few minutes of fluffing, it will return to essentially its full volume. The container 10 has a size of about 11 inches long, 11 inches wide, and 1¾ inches high. It is preferably formed of heat treated aluminum and weighs about eight pounds. The sleeping bag can be about 86 inches long, 30 inches at its widest outer diameter and 19 inches at its smallest outer diameter and can weigh about four pounds.

Figure 7:
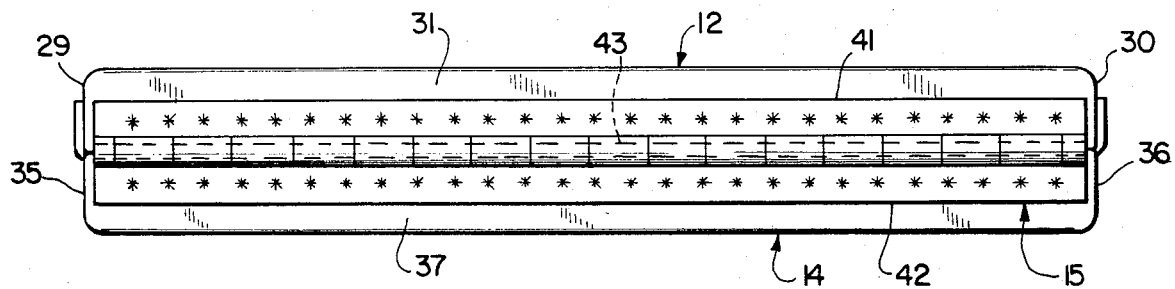
FIG. 7 is a rear end elevational view of the container showing the hinge assembly.

The top and bottom members 12 and 14 are formed as first and second planar rectangular members with depending flanges on two sides and the rear end. Thus, as seen best in FIG. 6, the top member 12 comprises a top plate 28, two side flanges 29 and 30 and a rear end flange 31. Bottom member 14 comprises a bottom plate 34, two side flanges 34 and 36 and a rear end flange 37. The top and bottom members 12 and 14 are mirror images in size and configuration except for side flanges 35 and 36 on bottom member 14 which are longer and bent outward to telescopically receive side flanges 29 and 30 on the top member as seen in FIGS. 5 and 7.

Formed in the top plate near the front edge is a series of apertures 39 for the reception of fasteners 23 to secure the first bar 21 to the top member. Similarly, a series of apertures 40 are formed in bottom plate 34 in the bottom member 14 to receive fasteners 24 therein to secure the second bar 22 to the bottom member 14.

The hinge assembly 15 is formed from a pair of interfingering piano-type hinge members 41 and 42 with member 41 being spot welded to rear end flange 31 on the top member and with hinge member 42 being spot welded to rear end flange 37 on the bottom member. A suitable hinge pin 43 is interposed between the hinge members as seen in FIG. 7.

As discussed above, the closure assembly 16 comprises the first and second bars 21 and 22, a pair of frangible torsional shear bolts 19 and 20, and a pair of releasing levers 17 and 18. In addition, a pair of threaded hex nuts 45 and 46 shown in FIG. 6 are used to couple the first and second bars together in association with the shear bolts.

Each bar is similarly formed so only one will be described in detail. As seen in FIGS. 6, 9 and 10, the first bar 21 is substantially square in cross section and extends substantially completely across the top member 12 of the container between side flanges 29 and 30. An elongated recess 47 is formed in the front face of the bar for the reception of the releasing lever therein. From the top surface of the bar 21 through to the recess 47 are formed a series of threaded bores 48 which are aligned with apertures 39 in the top plate 28 of the top member 12 so that fasteners 23 can be threadedly engaged with these threaded bores 48. This couples the bar to the top member. Adjacent the left hand end of bar 21 as seen in FIG. 6 is a square aperture 50 passing from the top surface of the bar through to the recess 47. Aligned with square aperture 50 and extending from the bottom surface of the bar through to the recess 47 is a square aperture 52 having a smaller cross section than aperture 50. A similar square aperture 53 is formed in bar 21 adjacent the right hand end from the bottom surface through to recess 47.

Aperture 50 is used to allow the shear bolt 19 to be maneuvered into the first bar 21 and aperture 52 receives a part of that bolt once the bolt is fully received therein. This is best seen in FIG. 9. Square aperture 53 is used to receive a square portion of the shear bolt 20 with the square aperture and square portion having substantially the same cross section so there is no relative pivotal movement therebetween. As seen in FIG. 6, bars 21 and 22 are identical so that square aperture 52 in bar 21 aligns with square aperture 53 in bar 22 when they are connected by bolts 19 and 20. This is the same for square aperture 52 in bar 22 and square aperture 53 in bar 21.

Figure 13:
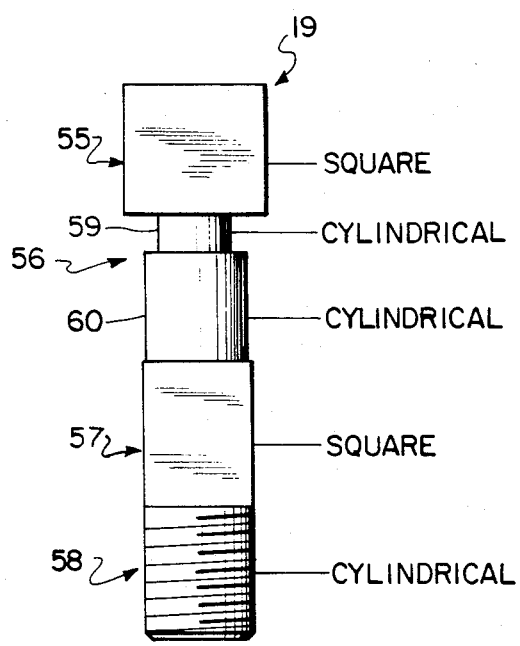
FIG. 13 is an enlarged front end elevational view of the torsional shear bolt shown in FIG. 9.

Each of the torsional shear bolts 19 and 20 are formed alike so only one will be described in detail. Thus, as seen in FIGS. 6 and 13, the shear bolt comprises an integrally formed stainless steel member including a first portion 55 having a square cross section, a frangible portion 56 extending from the first portion, a second portion 57 having a square cross section extending from the frangible portion and a threaded portion 58 extending from the second portion 57 and having a cylindrical cross section. The transverse dimensions of the second square portion 57 and the threaded cylindrical portion 58 are substantially the same but smaller than the transverse dimension of the first square portion 55. The frangible portion 56 is comprised of a third portion 59 having a cylindrical cross section and a fourth portion 60 having a cylindrical cross section larger than the cross section of the third cylindrical portion 59 and slightly smaller than the transverse dimension of the second square portion 57. When torsional shear forces are applied to the shear bolt, the bolt will break in the area of the third cylindrical portion 59 as seen in FIGS. 11 and 12. Advantageously, the first square portion 55 can have a side length of about 0.250 inch, the diameter of the third cylindrical portion 59 can be about 0.125 inch, the diameter of the fourth cylindrical portion 60 can be about 0.180 inch, the side length of the second square portion 57 can be about 0.186 inch and the diameter of the threaded cylindrical portion 58 can be about 0.186 inch. In conjunction with these transverse dimensions, the first square portion 55 can have a longitudinal dimension of about 0.230 inch, the third cylindrical portion 59 can have a longitudinal dimension of about 0.063 inch, the fourth cylindrical portion 60 can have a longitudinal dimension of about 0.187 inch, the second square portion 57 can have a longitudinal dimension of about 0.230 inch and the threaded cylindrical portion 58 can have a longitudinal dimension of about 0.250 inch.

With such dimensional relationships, the shear bolt 19 can extend between bars 21 and 22 so that the first square portion 55 is received in recess 47 of bar 21, the third and fourth cylindrical portions 59 and 60 are received in square aperture 52 in the first bar 21, the second square portion 57 is received in the square aperture 53 in the second bar 22 and the threaded cylindrical portion 58 is received in the recess 47 in the second bar 22. The first square portion 55 is larger than the square aperture 52 to prevent the bolt from going further into that aperture and nut 46 is threadedly engaged over the threaded portion 58 of the bolt in recess 47 to keep the bolt in that position and thereby bolt the first and second bars 21 and 22 together to prevent separation thereof. As mentioned above, the second square portion 57 has a square cross section substantially equal to but slightly smaller than the square cross section of square aperture 53 so there is no relative rotation therebetween.

Figure 8:
FIG. 8 is a bottom plan view of the upper releasing lever shown in FIG. 5.

To break the shear bolt 19, lever 17 has a square aperture 62 at an end for rigidly receiving the first square portion 55 on the shear bolt. This square aperture is seen in FIG. 8. Thus, when lever 17 is pivoted relative to the first bar 21 it will in turn pivot the first square portion 55 and, since the second square portion 57 cannot pivot relative to the square aperture 53 in the second bar 22, the frangible portion 56 made of the third and fourth cylindrical portions 59 and 60 will break. This is illustrated in FIGS. 11 and 12 which shows the pivotal movement of the upper and lower releasing levers 17 and 18. Since the bolt is broken, the top and bottom members can be pivoted apart as seen in FIG. 12, as well as in FIG. 4, to allow the compressed sleeping bag to spring open the container.

As seen in FIGS. 5, 6, 8 and 9, each lever has an aperture 63 at the end opposite the square aperture 62 for receiving the lanyard therein.

As will be described in more detail hereinafter, the closure assembly 16 is first assembled so that the first and second bars 21 and 22 are coupled together by the two shear bolts 19 and 20 with the releasing levers 17 and 18 coupled to their respective shear bolts and residing in the recesses 47; and then the sleeping bag 11 is compressed into the hingedly connected top and bottom members 12 and 14 of the container with the closure assembly 16 being fastened to the top and bottom members via fasteners 23 and 24 with the sleeping bag contained in the container.

APPARATUS AND METHOD FOR COMPRESSING THE SLEEPING BAG INTO THE CONTAINER

As seen in FIGS. 15–20, the apparatus for compressing the down sleeping bag 11 into the container 10 is shown diagrammatically. The container uses the closure assembly 16 for closing the open end of the container with the sleeping bag therein. The open end is defined between the opposed top plates 28 and 34, opposed side flanges 29, 30 and 35, 36 at the end of the top and bottom members 12 and 14 opposite the hinge assembly 15.

The apparatus for compressing the sleeping bag basically comprises a sleeve 70 having a first open end 71 and a second open end 72, a compressing ram 73, a piston rod 74 rigidly coupled to the compressing ram and a hydraulic cylinder 75 receiving the piston rod 74 therein. The hydraulic cylinder and piston rod will move the compressing ram into and out of the sleeve to draw the sleeping bag into the sleeve and then push the sleeping bag into the container 10.

The sleeve 70 is formed from upper and lower sections 77 and 78 of heavy, rigid metal and are configured and coupled together in a suitable manner to define a cavity 79 inside the sleeve with a rectangular cross section substantially equal to the cross section of the container 10. Cavity 79 has four planar liners 80, 80 and 81, 81 rigidly secured on the inside of the sleeve 70 which have the same cross sectional configuration and dimension as the container 10. The upper section 77 of the sleeve extends past liner 80 and has a pivot assembly 83 coupled thereto which pivotally couples a threaded pin 84 thereto which has a threaded nut 85 at the end. A plurality of bores or passages 86 are formed through upper section 77 adjacent the end of liner 80 so that fasteners 23 can be passed therethrough to connect the closure assembly 16 to the top member 12 of the container. Adjacent the lower section 78 of the sleeve is a second pivot assembly 88 that pivotally couples plate 89 to the sleeve, this plate having a U-shaped flange 90 at the end thereof for reception of threaded pin 84. Plate 89 has a series of bores 91 passing completely therethrough and forming passages through which fasteners 24 can be maneuvered to connection the closure assembly 16 to the bottom member 14 of the container. An upstanding end wall 92 extends rigidly and upwardly from plate 89, with a pair of side walls 93 (only one being shown) being rigidly coupled to plate 89 and end wall 92. These side walls 93, end wall 92 and plate 89, in conjunction with the extending portion of the upper section 77 of the sleeve form a continuation of the sleeve and a continuation of the cavity 79 so that the container 10 can be supported adjacent to the first open end 71 of the sleeve. A pair of shims 94 and 95 are rigidly coupled to the inside of end wall 92 and are slightly spaced to receive the cylindrical portion of the hinge assembly 15 therebetween as seen in FIG. 18.

Figure 15:
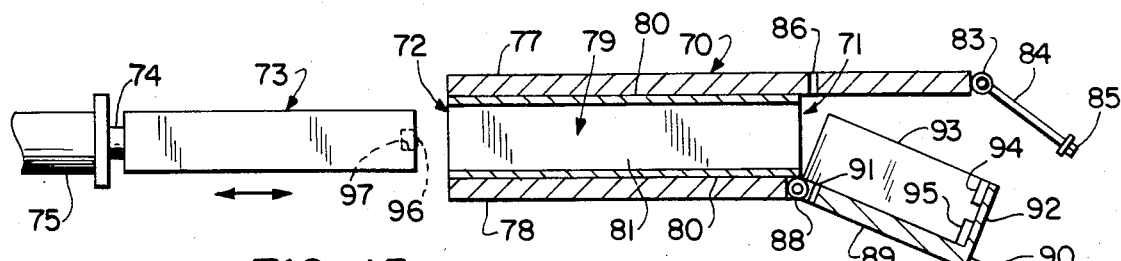
FIG. 15 is a diagrammatic elevational view in partial section showing the apparatus for compressing the sleeping bag into the container with the compressing ram being located adjacent the open ended sleeve.
Figure 16:
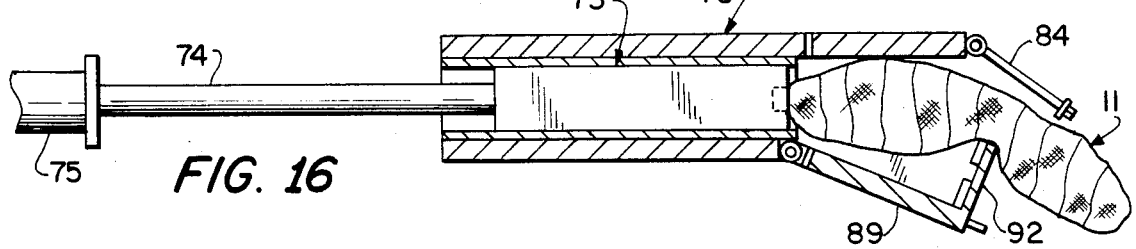
FIG. 16 is a view similar to that shown in FIG. 15 except that the compressing ram is located inside the sleeve and the sleeping bag is coupled to the ram.

While only one U-shaped flange 90 and locking pin 84 are shown in FIG. 15, more can be used as desired or necessary.

As seen in FIG. 18, the volume defined by side walls 93, end wall 92, plate 89 and upper section 77 of the sleeve is substantially equal to the volume defined by the container 10, thus the container fits into this volume tightly. In addition, the liners inside the sleeve are aligned with the top and bottom members and the side flanges of the container and the rear end flanges of the container abut shims 94 and 95.

In this position, the container is releasably supported to the sleeve with the open end of the container aligned with the sleeve first open end 71.

As seen in FIG. 15, a magnet 96 is received in a recess 97 in the front face of the compressing ram 73 in a flush position, this magnet being adhered to the ram such as by an adhesive.

Figure 17:
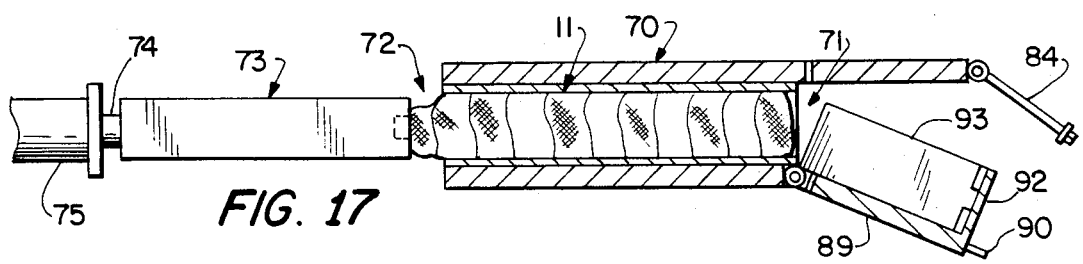
FIG. 17 is a view similar to that shown in FIG. 16 except that the compressing ram has been retracted out of the sleeve while the sleeping bag has been drawn into the sleeve.

The method of compressing the down sleeping bag 11 into the container 10 begins with maneuvering the sleeping bag to the open ended sleeve 70. This is advantageously accomplished by moving the compressing ram into the sleeve via the second open end 72 and then through the sleeve into a position adjacent the first open end 71 as shown in FIG. 17, attaching the sleeping bag to the compressing ram in any suitable fashion such as hooking the bag to the ram face, and then moving the ram to a position adjacent the second open end, thereby drawing the sleeping bag into the sleeve, as shown in FIG. 17.

The next step in the method includes rigidly supporting the container 10 at the first open end 71 of the sleeve with the open end of the container aligned with the first open end of the sleeve, as shown in FIG. 18. This is accomplished by closing the sleeve by means of pivoting plate 89, end wall 92 and side walls 93 upwardly from the position shown in FIG. 17 to that shown in FIG. 18 and interposing threaded pin 84 into U-shaped flange 90 and threading nut 85 upwardly. In this position shown in FIG. 18, the sleeve cavity 79 is aligned with the cavity defined by the container.

At the same time, the closure assembly 16 is interposed between the compressing ram 73 and the end of the sleeping bag adjacent the second open end of the sleeve, as seen in FIG. 18. In this step, the closure assembly is affixed to the ram by means of the magnet 96.

Next, the compressing ram is moved towards the first open end 71 of the sleeve as shown in FIG. 19 to push the sleeping bag and the closure assembly through the sleeve and into the container.

While the ram is still in this position, the fasteners 23 and 24 are passed through the sleeve apertures 86 and the plate apertures 91 and these fasteners are applied to the container and closure assembly, thereby rigidly coupling the closure assembly to the container with the compressed sleeping bag located inside the container.

Then, the container is removed from its location at the first open end of the sleeve by means of releasing pin 84 from flange 90 and pivoting plate 89 away from the upper section 77 to a position such as that shown in FIG. 17.

Thus, the sleeping bag 11 is fully compressed into the volume defined by the container 10 as closed by the closure assembly 16 which is rigidly coupled thereto, as shown diagramatically in FIG. 20.

Figure 1:
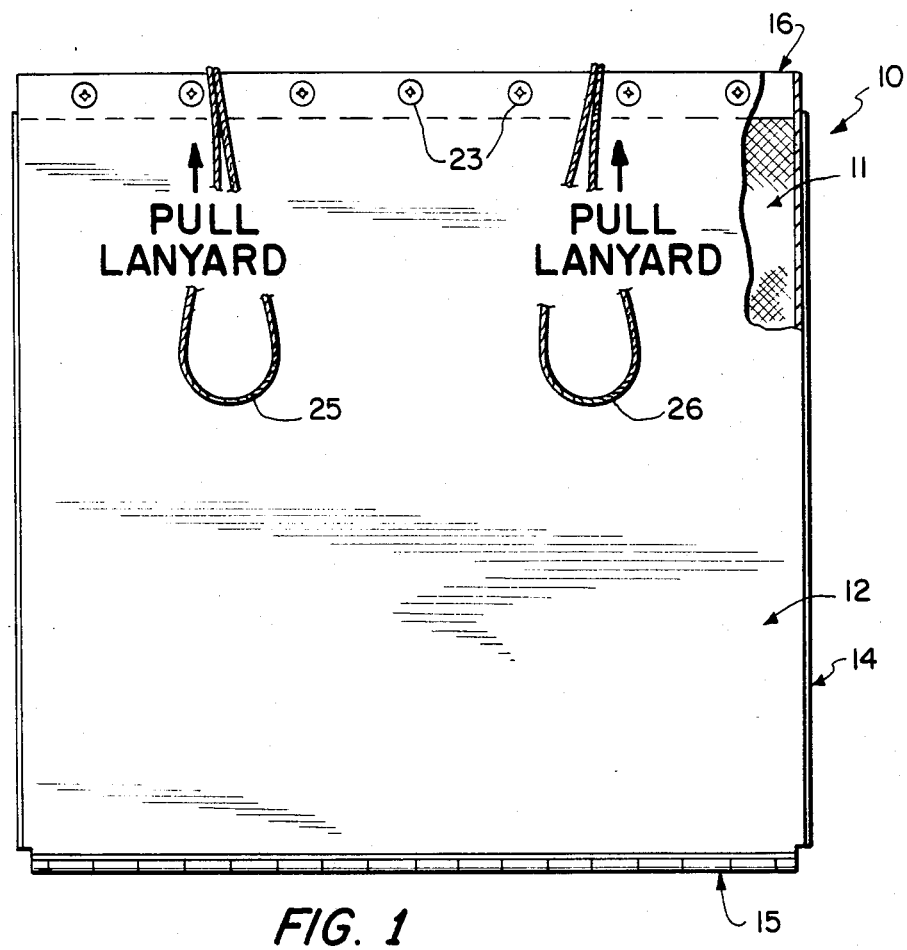
FIG. 1 is a top plan view of the container in accordance with the present invention having a compressed sleeping bag contained therein.
Figure 2:
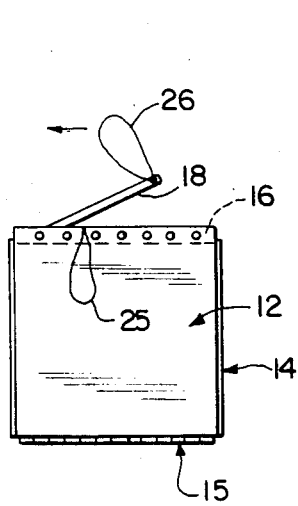
FIG. 2 is a top plan view similar to that shown in FIG. 1 except that one of the releasing levers has been pivoted relative to the container.

To use the sleeping bag, the releasing levers 17 and 18 are pivoted relative to the container as seen in FIGS. 2 and 3, at which time the shear bolts are broken and the compressed sleeping bag 11 can spring outwardly to hingedly open the container as seen in FIG. 4.

While an advantageous embodiment has been chosen to illustrate the container for the sleeping bag and the apparatus for compressing the sleeping bag into the container in accordance with the invention, it will be understood by those skilled in the art that various changes and modifications can be made therein without departing from the scope of the invention as defined in the appended claims. For example, it has been found desirable to interpose a layer of nylon between the bag 11 and the sleeve liners 80, 80 and 81, 81 to reduce the chance of damage to the bag during compression.

What is claimed is:

1. A container for a compressed sleeping bag, the combination comprising:
   a first planar, rectangular member having depending flanges on two sides and an end;
   a second planar, rectangular member having depending flanges on two sides and an end;
   hinge means, coupled to said end flanges of said first and second members, for hingedly coupling said first and second members; and
   closure means, coupled to said first and second members, for releasably coupling said first and second members in a closed position against the force of the compressed sleeping bag contained therein,
   said closure means including
      a first bar rigidly coupled to said first member at the other end thereof,
      a second bar rigidly coupled to said second member at the other end thereof,
      frangible means, coupled to said first and second bars, for preventing separation thereof, and
      a lever rigidly coupled to said frangible means for breaking said frangible means upon pivotal movement thereof relative to said first and second members to allow separation thereof.

2. A container according to claim 1, wherein said frangible means comprises a bolt extending into said first and second bars.

3. A container according to claim 2, wherein said bolt comprises
   a first portion having a square cross section,
   a second portion having a square cross section, and
   a frangible portion integrally formed between said first and second portions.

4. A container according to claim 3, wherein said bolt further comprises
   a threaded portion having a cylindrical cross section and integrally formed with said second portion.

5. A container according to claim 3, wherein said frangible portion comprises
   a third portion having a cylindrical cross section, and
   a fourth portion having a cylindrical cross section larger than that of said third portion and integrally formed therewith.

6. A container according to claim 3, wherein said first square portion is coupled to said lever and extends into said first bar, and
said second bar has a square aperture receiving said second square portion therein.

7. A container according to claim 4, wherein said first and second bars each have a longitudinal recess therein and a square aperture, which apertures extend between said recesses and are aligned,
said bolt extends through said square apertures with said first square portion being located in said recess in said first bar, said threaded portion being located in said recess in said second bar, said frangible portion being located in said square aperture in said first bar, and second second square portion being located in said square aperture in said second bar,
said first square portion is coupled to said lever, and
said threaded portion has a nut threadedly coupled thereto, said nut being located in said recess in said second bar.

8. A container according to claim 7, wherein said first square portion has a cross section larger than the cross section of the square aperture in said first bar, and
said second square portion has a cross section substantially equal to the cross section of the square aperture in said second bar.

9. A container according to claim 1, wherein said frangible means comprises a torsional shear bolt,
said first bar has an aperture receiving a first portion of said bolt while allowing relative pivotal movement therebetween,
said second bar has an aperture receiving a second portion of said bolt while preventing relative pivotal movement therebetween, and
said lever is coupled to said first portion of said bolt.

10. A container according to claim 9, wherein said first bar has a recess receiving said lever therein.

* * * * *